United States Patent
Takai

(10) Patent No.: US 7,568,974 B2
(45) Date of Patent: Aug. 4, 2009

(54) VIDEO GAME PROCESSING APPARATUS, A METHOD AND A COMPUTER PROGRAM PRODUCT FOR PROCESSING A VIDEO GAME

(75) Inventor: Shintaro Takai, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 324 days.

(21) Appl. No.: 11/739,955

(22) Filed: Apr. 25, 2007

(65) Prior Publication Data

US 2007/0265045 A1    Nov. 15, 2007

(30) Foreign Application Priority Data

Apr. 28, 2006    (JP)    .............................. 2006-126600

(51) Int. Cl.
 *A63F 13/00*    (2006.01)
(52) U.S. Cl. .......................................... 463/31; 463/42
(58) Field of Classification Search ................... 463/31, 463/42
 See application file for complete search history.

(56) References Cited

U.S. PATENT DOCUMENTS

| | | | | |
|---|---|---|---|---|
| 6,354,940 | B1 * | 3/2002 | Itou et al. ...................... | 463/8 |
| 7,390,254 | B2 * | 6/2008 | Hirai ............................. | 463/4 |
| 7,448,950 | B2 * | 11/2008 | Matsumoto ................... | 463/31 |

2007/0026944 A1    2/2007    Maehiro et al.

FOREIGN PATENT DOCUMENTS

| | | |
|---|---|---|
| JP | 6-105959 | 4/1994 |
| JP | 6-269566 | 9/1994 |
| JP | 2001-300143 | 10/2001 |
| JP | 2004-057797 | 2/2004 |

OTHER PUBLICATIONS

English language Abstract of JP 6-269566.
U.S. Appl. No. 11/740,041 to Sato, which was filed on Apr. 25, 2007.
U.S. Appl. No. 11/741,221 to Nomura, which was filed on Apr. 27, 2007.
English language Abstract of JP 6-105959.
English language Abstract of JP 2001-300143.
English language Abstract of JP 2004-057797.

* cited by examiner

*Primary Examiner*—John M Hotaling, II
*Assistant Examiner*—Masud Ahmed
(74) *Attorney, Agent, or Firm*—Greenblum & Bernstein, P.L.C.

(57) ABSTRACT

A predetermined special control point is added to an accumulated special control point in accordance with predetermined lapse of time up to a predetermined maximum accumulated value. An image display apparatus displays the accumulated special control point on the image display screen. The special control is executed in the case where the accumulated value of the special control point is more than an initial value when an instruction to execute special control is received on the basis of operations of the player. In this case, an action speed of a non-player character is caused to become slow with respect to that of a player character under the special control.

12 Claims, 12 Drawing Sheets

| Character Name | Static Pattern 1 | ...... | Attack Pattern 1 | ...... | Special Pattern 1 | ......... |
|---|---|---|---|---|---|---|
| Enemy Character A | Static A | ...... | Attack A | ...... | Special A | ......... |
| Enemy Character B | Static B | ...... | Attack B | ...... | Special B | ......... |
| Enemy Character C | Static C | ...... | Attack C | ...... | Special C | ......... |
| ⋮ | ⋮ | ⋮ | ⋮ | ⋮ | ⋮ | ⋮ |

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2006-126600, filed on Apr. 28, 2006, the disclosure of which is expressly incorporated herein by reference in its entirety.

BACKGROUND OF THE INVENTION

1. Field of the Invention

The present invention relates to a technique for controlling progress of a video game by displaying a player character on an image display screen of an image display apparatus, and by controlling an action of the characters displayed on the image display screen in response to operation(s) by a player.

2. Description of the Related Art

Heretofore, various kinds of so-called role playing games (RPG; that is, a game in which a player plays a role of a character in a world of the game, and accomplishes a predetermined object while enjoying a process that the character grows through various experiences) have been provided.

Part of the appeal of a RPG is generally a scene in which a player character acting in response to operations by the player executes a battle against an enemy character thwarting accomplishment of a predetermined object in the RPG. However, in a conventional battle scene, actions of the player character and the enemy character are alternately executed one by one. For this reason, realism (realistic sensation) of an action scene (in particular, a battle scene) was low.

On the other hand, Japanese Patent Application Publication No. 6-105959 discloses that an enemy character attacks a game character when specific setting time for the enemy character elapses without stopping lapse of time even while the player inputs a command for the game character. Specifically, in this patent application publication, it is adopted a gauge gradually filling in accordance with lapse of time during a battle between the game character and the enemy character. The player can input a command for the game character when the gauge is full. Thus, realism (realistic sensation) of a battle scene is improved.

Further, it has been proposed that motion of an enemy character is made slow under certain conditions as a special control process for a battle scene (see Japanese Patent Application Publications No. 2001-300143 and No. 2004-57797). The former patent application publication discloses that motion of a player character is made slow when a specific event occurs, and a player can thereby secure enough time to input a next command. The latter patent application publication discloses that an action speed of an enemy character is made slow apparently in a shooting game, in particular, and this makes it possible to improve a hit rate of the shooting.

However, in a battle method disclosed in Japanese Patent Application Publication No. 6-105959, although realism (realistic sensation) of a battle scene is to be improved, a player may simply operate the game character only with attention to timing of input of a battle command. For this reason, play in the battle scene becomes monotonous, whereby interest in the play of the player may be lowered.

Further, in the control method disclosed in Japanese Patent Application Publications No. 2001-300143 and No. 2004-57797, the action of the player character merely becomes a slow motion at specific timing defined in advance. Thus, even a beginner of the game can execute command operations. However, there is a fear that a skilled player looses his or her interest, in particular. As a result, interest in the play of the player may be lowered.

SUMMARY OF THE INVENTION

It is one object of the present invention to solve the problems described above and to provide a video game processing apparatus, a method and a computer program product for processing a video game by which it is possible to execute control processes rich in variety of a battle scene and the like, and this makes it possible to improve interest in a video game for a player.

In order to achieve the above object, one aspect of the present invention is directed to a video game processing apparatus that causes an image display apparatus to display a player character on an image display screen of the image display apparatus. The video game processing apparatus controls progress of the video game by controlling an action of the player character to be displayed on the image display screen in accordance with operations by a player. The video game processing apparatus of the present invention includes a special control point adder that adds a predetermined special control point to an accumulated special control point in accordance with predetermined lapse of time up to a predetermined maximum accumulated value.

The video game processing apparatus also includes an accumulated special control point display controller that causes the image display apparatus to display the accumulated special control point on the image display screen.

The video game processing apparatus also includes a special control executing instruction receiver that receives an instruction to execute special control on the basis of operations of the player, an action speed of a non-player character being caused to become slow with respect to that of the player character under the special control.

The video game processing apparatus also includes a special control executor that executes the special control in the case where the accumulated value of the special control point is more than an initial value when the special control executing instruction receiver receives the instruction to execute the special control.

Since the video game processing apparatus may have the configuration described above, it is possible to execute control processes rich in variety of a battle scene and the like, and this makes it possible to improve interest in a video game for a player.

It is preferable that the video game processing apparatus further includes a special control point subtracter that subtracts a predetermined special control point from the accumulated special control point up to the initial value with specific lapse of time in the case where the special control executor starts to execute the special control. In this case, the special control executor may terminate the execution of the special control when the accumulated special control point becomes the initial value by subtracting the predetermined special control point from the accumulated special control point by means of the special control point subtracter.

It is preferable that the video game processing apparatus further includes a non-player character action controller that controls an action of the non-player character using an action pattern setting table, an action pattern of the non-player character being set in the action pattern setting table in advance. In this case, the action pattern may include an action pattern at the special control that becomes available at the special control.

It is preferable that, in the case where the action pattern at the special control becomes selectable during the execution of the special control and the action pattern at the special control is further selected, the non-player character action controller controls the action of the non-player character in accordance with the further selected action pattern at the special control process.

It is preferable that the action pattern at the special control includes an action pattern in which an action speed of the non-player character is fast to the extent that the player character cannot respond to the action of the non-player character at non-special control, but the action speed of the non-player character is caused to become slow to the extent that the player character can respond to the action of the non-player character at the special control.

It is preferable that the special control executing instruction receiver can receive an instruction to execute the special control on the basis of operations of the player at least at a battle scene and a movement scene of the player character. In this case, the non-player character that is a target of the special control includes an enemy character that aggressively thwarts an action of the player character, a neutral character that does not thwart an action of the player character aggressively, and an event attracting character that attracts the player character to a predetermined event without thwarting an action of the player character.

It is preferable that the video game processing apparatus further includes a specific control executor that executes a specific control when a predetermined specific control activating condition is met, an action speed of the non-player character being caused to because fast with respect to that of the player character in the specific control process.

Further, in another aspect of the present invention, the present invention is directed to a method of processing a video game by causing an image display apparatus to display a player character on an image display screen of the image display apparatus. In this case, the method controls progress of the video game by controlling an action of each character to be displayed on the image display screen in accordance with operations by a player. The method of the present invention includes adding a predetermined special control point to an accumulated special control point in accordance with predetermined lapse of time up to a predetermined maximum accumulated value.

The method also includes causing the image display apparatus to display the accumulated special control point on the image display screen.

The method also includes receiving an instruction to execute special control on the basis of operations of the player, an action speed of a non-player character being caused to become slow with respect to that of the player character under the special control.

The method also includes executing the special control in the case where the accumulated value of the special control point is more than an initial value when the instruction to execute the special control is received.

Moreover, still another aspect of the present invention is directed to a computer program product for processing a video game. In this case, progress of the video game is controlled by causing an image display apparatus to display a player character on an image display screen of the image display apparatus, and controlling an action of each character to be displayed on the image display screen in accordance with operations by a player. The computer program product of the present invention causes a computer to execute steps including adding a predetermined special control point to an accumulated special control point in accordance with predetermined lapse of time up to a predetermined maximum accumulated value.

The steps also include causing the image display apparatus to display the accumulated special control point on the image display screen.

The steps also include receiving an instruction to execute special control on the basis of operations of the player, an action speed of a non-player character being caused to become slow with respect to that of the player character under the special control.

The steps also include executing the special control in the case where the accumulated value of the special control point is more than an initial value when the instruction to execute the special control is received.

According to the present invention, it is possible to execute control processes rich in variety of a battle scene and the like. Therefore, this makes it possible to improve interest in a video game for a player.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
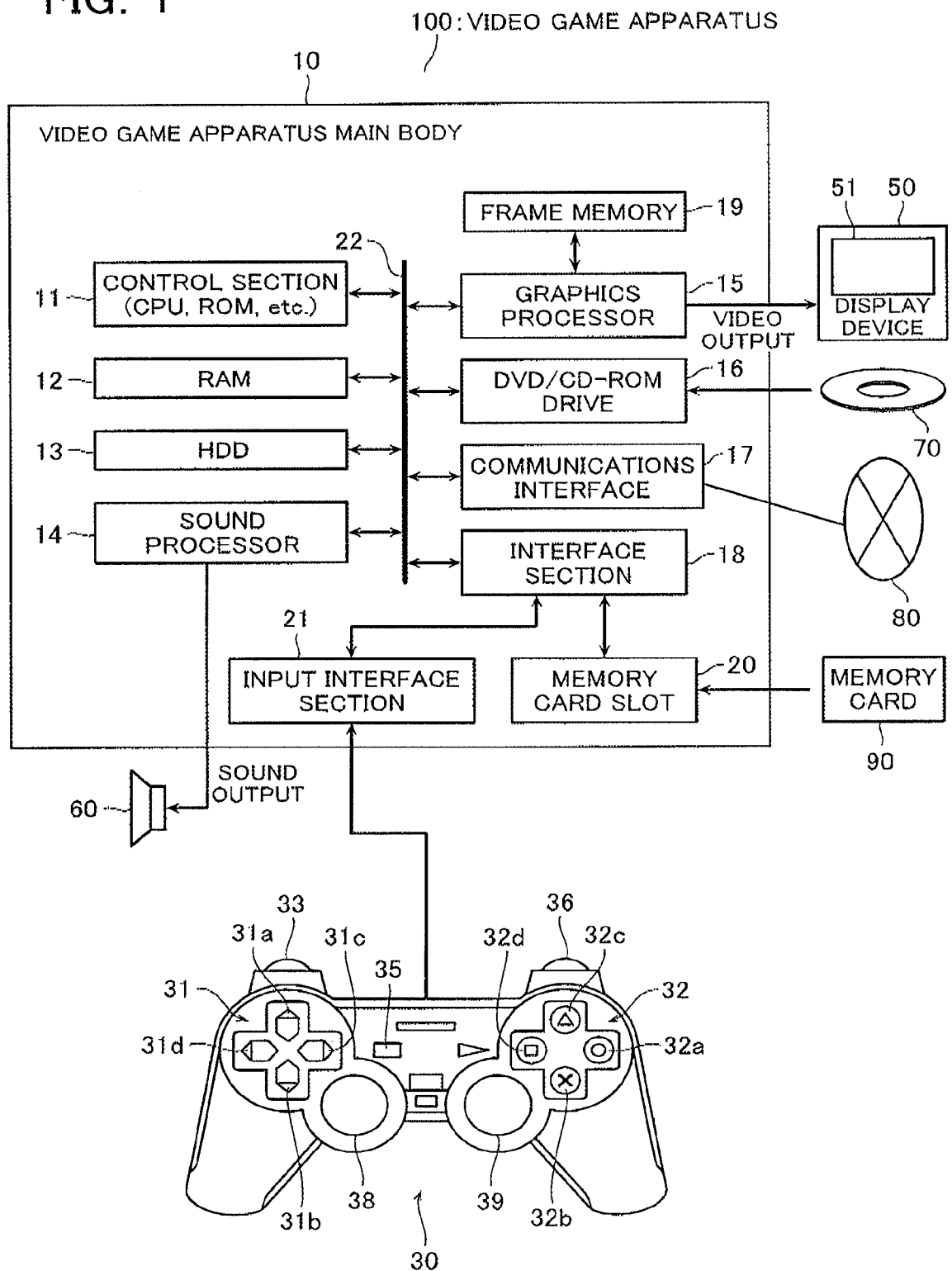
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention. As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with an image display screen 51. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption. The RAM 12 is used as a work area for the control section 11. The HDD 13 is a storage area for storing the control programs and various data.

The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the image display screen 51 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70.

The communications interface 17 is connected to a communication network 80 such as the internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21 and the memory card slot 20 is connected to the interface section 18. The interface section 18 causes instruction data from the input interface section 21 to be stored in the RAM 12 on the basis of operation(s) of a controller device such as a keypad 30 by a player of the video game apparatus 100. In response to the instruction data stored in the RAM 12, the control section 11 executes various arithmetic processing.

The video game apparatus main body 10 is connected to the controller device such as the keypad 30 as an operation input section (controller) via the input interface section 21. However, other types of controllers may be used without departing from the scope or spirit of the present invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d. The group of buttons 32 includes a circle button 32a, an X button 32b, a triangle button 32c and a square button 32d. Further, a select button 35 is arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 is provided with multiple switches respectively connected to the cross key 31, the circle button 32a, the X button 32b, the triangle button 32c, the square button 32d, the select button 35, the R1 button 36 and the L1 button 33. When pressing force is applied to any button, the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are outputted to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12. The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 executes processing.

It is assumed that a three-dimensional video game according to an aspect of the present embodiment is a video game wherein multiple characters, including a player character (that is, a character that moves in accordance with the operation of the keypad 30 by the player), move on a field provided in a virtual three-dimensional space, by which the video game proceeds. In this regard, it is assumed that the virtual three-dimensional, space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that only a single player character and multiple non-player characters (which are moved in accordance with control processes of the video game apparatus 100 (more specifically, control processes of the control section 11), and hereinafter, referred to simply as "NPC") exist as objects that are movable in the virtual three-dimensional space. However, the explanations for any process other than the processes relating to the present invention are omitted, in particular. In this regard, in the present embodiment, video game control for a RPG is executed, but those skilled in the art will recognize and appreciate that changes to the present invention can be made without departing from the scope or spirit of the present invention.

Figure 2:
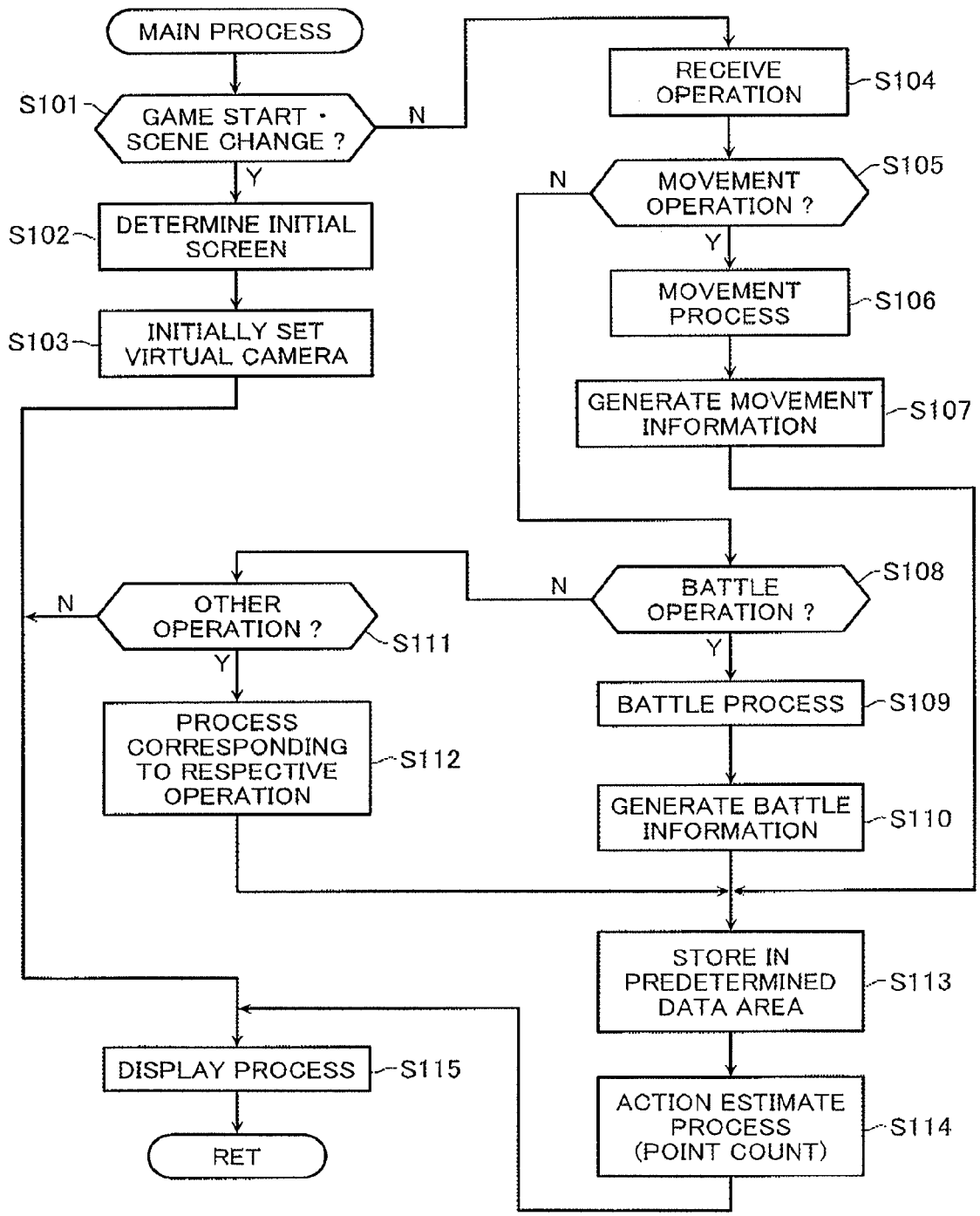
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process gas executed in accordance with a timer interruption at every 1/30 second. However, it is to be noted that timing of "at every 1/30 second" is only one example, as mentioned above. Instead, for example, the main process may be executed in accordance with a timer interruption at every single field period (every 1/60 second) or at every two frame periods (every 1/15 second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character and a battle by the player character, are allowed. In the case where a predetermined object in the field is accomplished, one stage may be terminated and the processing may proceed to another stage executed in a next field. Further, in the present embodiment, a same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a video game is generated through an operation of the keypad 30, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101). The timing state to change the scene is, for example, the time at which a virtual three-dimensional space illustrating a new scene is displayed on the image display screen 51 in order to finish the scene that has been displayed on the image display screen 51 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) 11 accordance with the control program (Step S102). In this case, various data, such as image data used for the video game and characters, are stored in the storage medium 70. At Step S102, an initial display position of the player character in an initial screen or a scene after a scene change (for example, a new stage in the RPG), a non-player character or non-player characters to be displayed, an initial display position of each of the non-player characters (NPCs) to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 by the player (Step S104). Namely, the control section 11 determines whether or not instruction data for executing movement of the player character or the like are inputted from the keypad 30 via the input interface section 21. In the case where effective instruction data (that is, it means that such effective instruction data are instruction data that is allowed to be received by the control section 11) are inputted, the control section 11 receives the effective instruction data.

In the case where the control section 11 receives instruction data for instructing an action of the player character relating to the movement of the player character (that is, movement instruction data: a movement instruction by a movement command or the cross key (directional instruction key)) in accordance with the operation of the keypad 30 relating to the movement of the player character (movement operation) at Step S104 ("Yes" at Step S105), the control section 11 executes a movement process in accordance with the movement instruction data thus received (Step S106). In the movement process, the control section 11 causes the position of the player character to be moved in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is in a melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, data on the size of a visual angle, and the like. The control section 11 then changes the setting content of the virtual camera. The movement information includes various kinds of information on the movement such as the position of the player character after the movement, the viewpoint position of the virtual camera, the direction of the visual axis, and the size of the visual angle changed along with the movement of the player character as well as the information on the movement of the player character. Then, the processing flow proceeds to Step S113.

In the case where the control section 11 receives instruction data for instructing an action for the player character relating to a battle (that is, battle instruction data: a battle command) in accordance with the operation of the keypad 30 by the player for instructing the action of the player character relating to a battle (a battle operation) at Step S104 ("Yes" at Step S108), the control section 11 executes a battle process in accordance with the received battle instruction data (Step S109). In the battle process, the control section 11 executes, for example, a process to determine a battle result and/or battle development between an enemy character (that is, a non-player character to battle against) and the player character, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character that battles an enemy character in the battle process, the name of the enemy character, battle development information, battle result information, a parameter (or parameters) that defines the ability (or abilities) of the player character, and the like. The battle information includes various kinds of information on the battle, such as the name of the player character that battles the enemy character, the name of the enemy character, battle development, battle result thereof, and a parameter that defines the ability of the player character. Then, the processing flow proceeds to Step S113.

In the case where the control section 11 receives instruction data for other instructions (that is, other instruction data: an other command) in accordance with the operation of the keypad 30 for executing other instruction (other operation) at Step S104 ("No" at Step S105, "No" at Step S108, and "Yes" at Step S111), the control section 11 executes a process (for example, a conversation between characters, a purchase action, a pick up action, and the like) in accordance with the other instruction data thus received (Step S112). The other information corresponding to the process result at Step S112 is then generated, and the processing flow proceeds to Step S113.

The control section 11 updates the current position of the player character by storing the movement information generated at Step S107 in a predetermined data area of the RAM 12 at Step S113. Further, the control section 11 memorizes and stores various action histories of the player character by storing the battle information generated at Step S110 and the other information generated after Step S112 in a predetermined data area of the RAM 12 at Step S113.

Subsequently, the control section 11 executes an action estimate process on the basis of the information indicating the action histories of the player character once stored in the RAM 12 (Step S114). More specifically, information required to be digitized is digitized using conversion tables prepared in advance. Further, with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character and the non-player characters to be displayed from the virtual camera onto the virtual screen in accordance with the setting contents of the virtual camera and the like. The control section 11 then executes a display process to generate a two-dimensional image to be displayed on the image display screen 51 (Step S115). When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the image display screen 51.

Now, the display process at Step S115 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character and the three-dimensional non-player characters are included, from the coordinates of the world coordinate system to the coordinates of the viewpoint coordinate system. Subsequently, the control section 11 transmits the coordinates of the vertexes of the polygons of the player character and the non-player characters in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the image display screen 51. By switching images displayed on the image display screen 51 every single frame period, the player can see images including the state in which the player character and/or the non-player characters are moved on the field and perceive the images as moving images.

Next, an example of a three-dimensional field screen displayed on the image display screen 51 of the display device 50 will now be described that shows a battle state between a player character and an enemy character.

Figure 3:
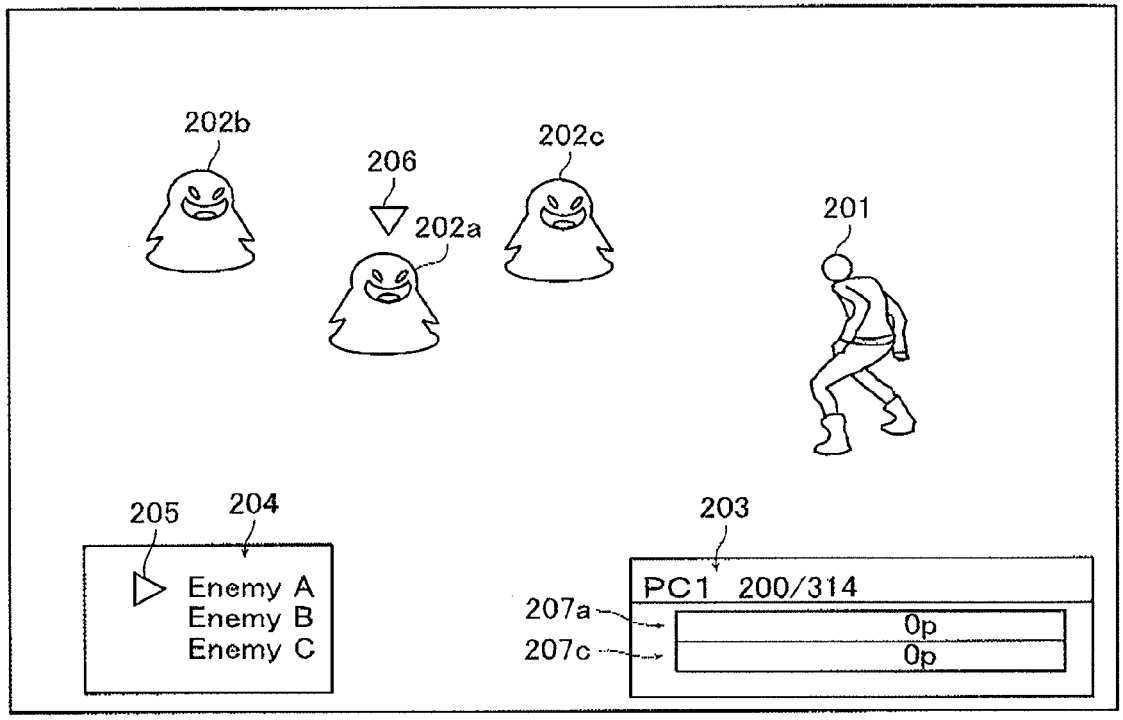
FIG. 3 is an explanatory drawing that shows an example of a three-dimensional field screen in a battle start state.

FIG. 3 is an explanatory drawing that shows an example of the three-dimensional field screen in a battle start state. As shown in FIG. 3, respective characters such as a player character 201, and enemy characters 202a to 202c that thwart accomplishment of a predetermined object in the video game are displayed in the three-dimensional field screen, for example. Further, in addition to the respective characters, an HP display region 203, an enemy character name display region 204, a selection cursor 205, a target cursor 206, an ATB gauge 207a, and a bullet meter 207c are provided in the three-dimensional field screen. A character name and the maximum value and a current value of a hit point (HP) for the player character 201 are displayed in the HP display region 203. A character name of each of the enemy characters 202a to 202c is displayed in the enemy character name display region 204. The selection cursor 205 is moved on the basis of an instruction signal using the keypad 30 from the player. A target that is a subject of an action of the player character 201 is specified by the target cursor 206. An accumulated value of an ATB (Active Time Battle) value is displayed in the ATB gauge 207a. An accumulated value of the bullet time value is displayed in the bullet meter 207c. In this regard, in the present embodiment, the accumulated value of the ATB gauge 207a and the accumulated value of the bullet meter 207c are set to be equal to each other. However, the accumulated value of the ATE gauge 207a and the accumulated value of the bullet meter 207c may be set so as to be different from each other.

Here, the "ATB value" means a value to which a predetermined value is added in accordance with lapse of time and from which other predetermined value is subtracted by means of execution of a command of the player character (for example, an action of the player character such as an attack and a defense) More specifically, the player cannot activate a command of the player character 201 unless the player waits until the ATB value is accumulated up to a predetermined value. In other words, the player must deliberately activate a command for the player character 201 changing with lapse of time while referring to an accumulated value of the ATB value displayed in the ATB gauge 207a. For this reason, it is expected that interest in the video game of the player is improved. A command process relating to addition and/or subtraction of such an ATB value will be described later in detail.

Further, the "bullet time value" means a value that is added with lapse of time, and is gradually subtracted in the case where bullet time control is started when the player selects execution of the bullet time control in a state that the bullet meter 207 is filled up. The "bullet time" means a constant period of time in which an action of an enemy character becomes a slow motion (that is, a period of time until the bullet time value becomes zero).

Figure 4:
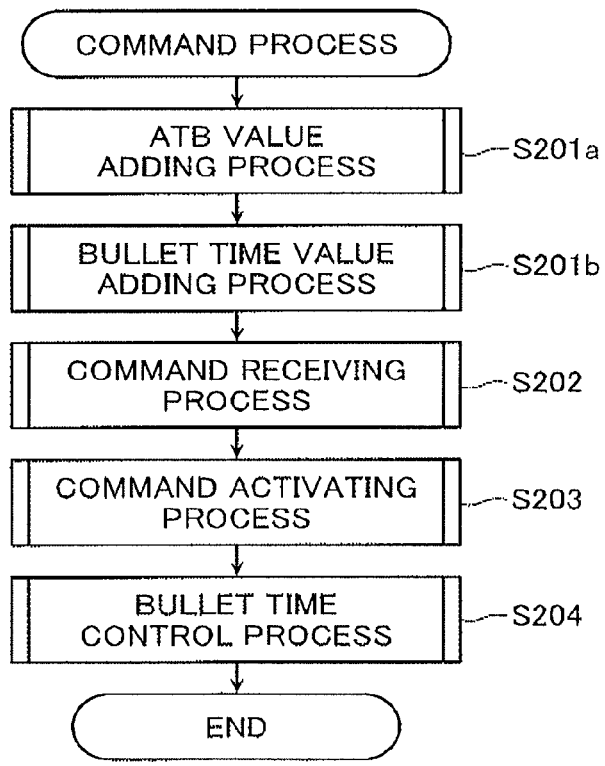
FIG. 4 is a flowchart that illustrates an example of a command process.

A command process to control an action of the player character on the basis of inputs from the player will be described with reference to FIG. 4. FIG. 4 is a flowchart that illustrates an example of a command process executed in the video game apparatus 100 of the present embodiment.

In the command process, the control section 11 first executes an ATB adding process in which an ATB value is added with lapse of predetermined time (Step S201a). Subsequently, the control section 11 executes a bullet time value adding process in which a bullet time value is added with lapse of specific time (Step S201b). The control section 11 then executes a command receiving process in which command input by means of the keypad 30 is received from the player (Step S202), and executes a command activating process in which the player character is caused to activate the received command (Step S203) Moreover, the control section 11 executes a bullet time control process in which bullet time control is executed in accordance with instructions by the player (Step S204).

Figure 5:
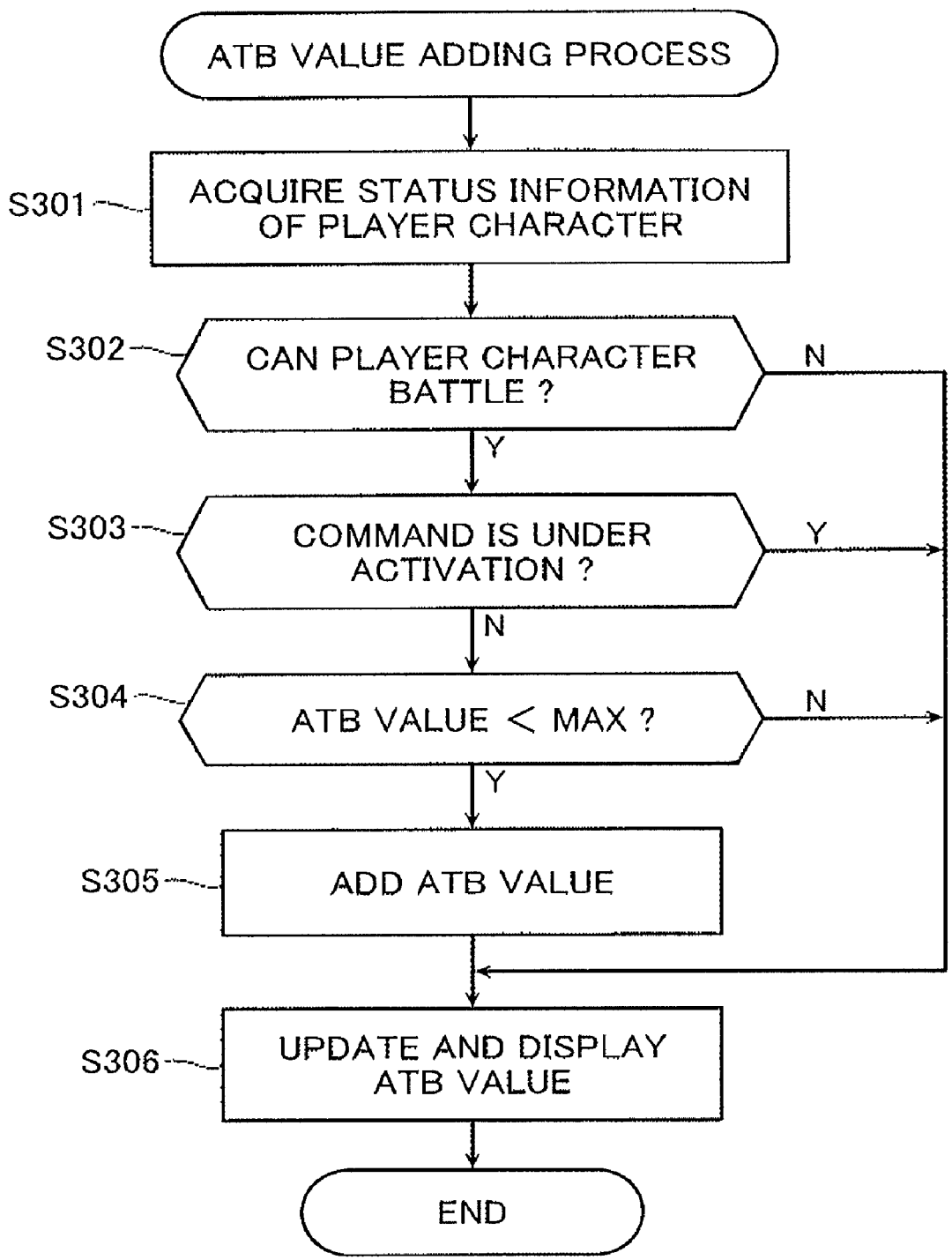
FIG. 5 is a flowchart that illustrates details of an ATB adding process.

Next, the ATB adding process described above (Step S201a) will be described in detail with reference to FIG. 5. FIG. 5 is a flowchart that illustrates details of the ATB adding process.

In the ATB adding process, the control section 11 first acquires status information of the player character (Step S301). Here, the "status information of the player character" is information indicating a status of the player character in the video game. The status information of the player character includes a health condition of the player character (a normal condition, a slow condition (that is, a state where an action of the player character is caused to be slow by means of an attack from an enemy character), a battle impossible condition and the like), a level (or growth) of the player character, items that the player character possesses, equipment of the player character, and a command state of the player character (during receipt of a command, during activation of a command, an ATB value and the like), for example.

Subsequently, the control section 11 determines, on the basis of the status information of the player character acquired at Step S301, whether the player character is in a battle possible state or not (Step S302). In the case where it is determined that the player character is in the battle possible state ("Yes" at Step S302), the control section 11 determines, on the basis of the status information of the player character, whether the player character activates any command or not (Step S303). Subsequently, in the case where it is determined that the player character is not activating any command ("No" at Step S303), the control section 11 determines whether the accumulated ATB value is less than the accumulated maximum value or not (Step S304). Here, in the case where it is determined that the accumulated ATB value is less than the accumulated maximum value ("Yes" at Step S304), the control section 11 adds a predetermined ATB value to the accumulated ATB value (Step S305), and updates a display state of the ATB gauge 207a to be displayed on the image display screen 51 of the display device 50 (Step S306). In this case, the control section 11 determines the predetermined ATB value on the basis of the status information of the player character. For example, in the case where the player character is in the "slow condition", the predetermined ATB value is set to a value lower than that in the "normal condition".

On the other hand, at Step S302, in the case where it is determined that the player character is not in a battle possible state ("No" at Step S302), the control section 11 causes the ATB value adding process to be terminated without adding a predetermined ATB value to the accumulated ATB value. Similarly, at Step S303, in the case where it is determined that the player character activates any command ("Yes" at Step S303), the control section 11 causes the ATB value adding process to be terminated without adding a predetermined ATB value to the accumulated ATB value. Further, at Step S304, in the case where it is determined that the ATB value is the accumulated maximum value ("No" at Step S304), the control section 11 causes the ATB value adding process to be terminated without adding a predetermined ATB value to the accumulated ATB value. Moreover, at Step S302, in the case where it is determined that the player character is not in a battle possible state ("No" at Step S302), the control section 11 may reset the ATB value (that is, set the ATB value to zero) to update the ATB value, and the ATB value adding process may be then terminated.

An added amount of the ATB value (that is, the predetermined ATB value) may specifically be set to 0.2 seconds per one point. Further, the added amount and the maximum value of the ATB gauge 207a may become larger in accordance with the level of the player character. More specifically, the maximum ATB value of the player character when the video game starts may be set to 40 points, while the maximum ATB value of the player character at an end game may be set to 200 points. Further, the control section 11 may increase the added amount and the maximum value of the ATB gauge 207a with the accumulated period of time when the video game is executed.

Figure 6:
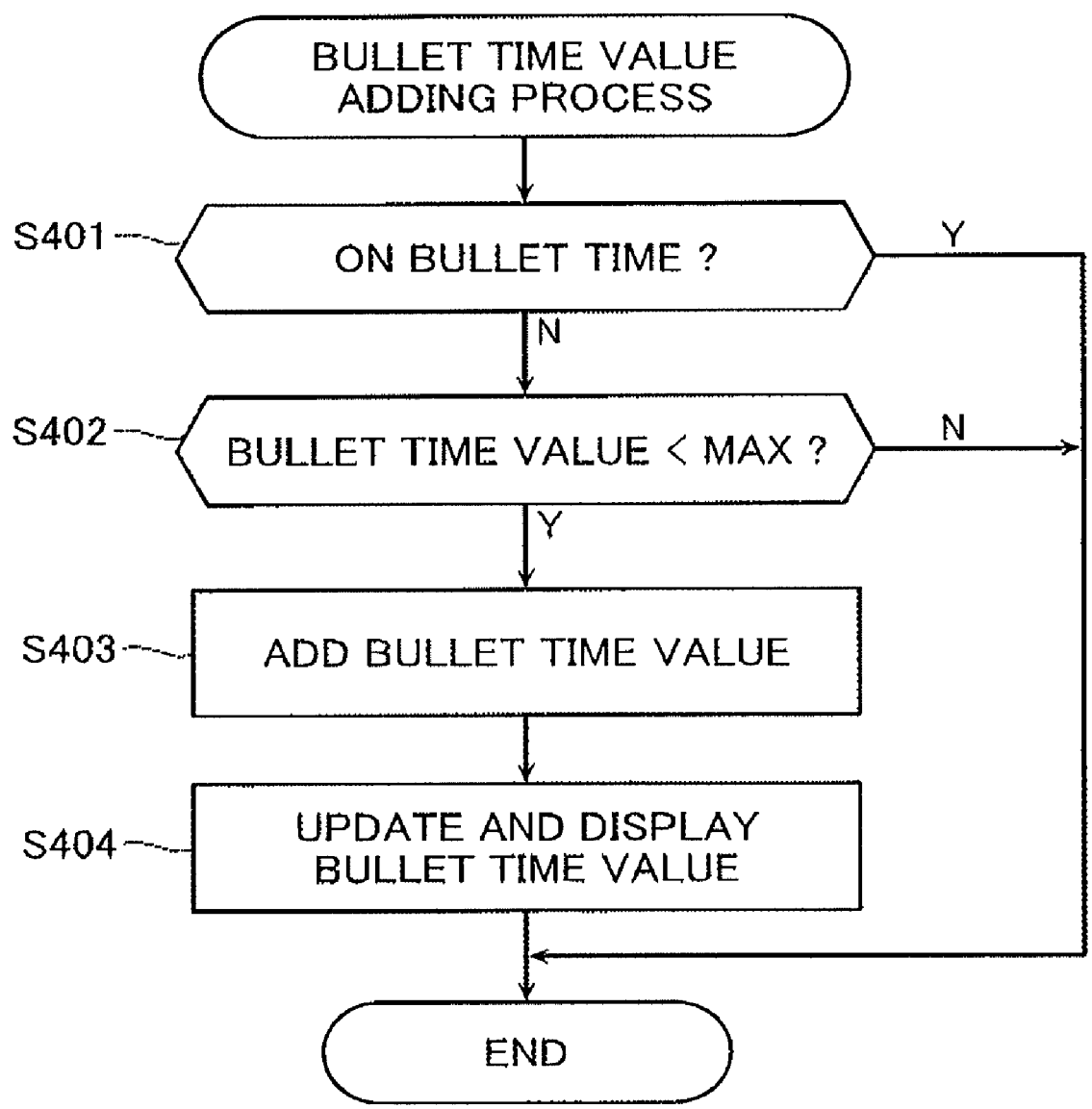
FIG. 6 is a flowchart that illustrates details of a bullet time value adding process.

Next, the bullet time value adding process described above (Step S201b) will be described in detail with reference to FIG. 6. FIG. 6 is a flowchart that illustrates details of the bullet time value adding process.

In the bullet time value adding process, the control section 11 first confirms whether bullet time control is being executed or not (Step S401). This confirmation is executed by confirming whether or not a bullet time flag (will be described later) is set or not. In the case where it is confirmed that the bullet time control is not being executed ("No" at Step 5401), the control section 11 determines whether the accumulated bullet time value is less than the accumulated maximum value or not (Step S402). Here, in the case where it is determined that the accumulated bullet time value is less than the accumulated maximum value ("Yes" at Step S402), the control section 11 adds a predetermined bullet time value to the accumulated bullet time value (Step S403), and updates a display state of the bullet time gauge 207c to be displayed on the image display screen 51 of the display device 50 (Step S404). In this case, the control section 11 determines the predetermined bullet time value (added amount) on the basis of the status information of the player character. For example, in the case where the player character is in the "slow condition", the predetermined bullet time value is set to a value lower than that in the "normal condition".

On the other hand, at Step S401, in the case where it is determined that the bullet time control is being executed ("Yes" at Step S401), the control section 11 causes the bullet time value adding process to be terminated without adding a predetermined bullet time value to the accumulated bullet time value.

An added amount of the bullet time value (that is, the predetermined bullet time value) may specifically be set to 0.2 seconds per one point. Further, the added amount and the maximum value of the bullet time gauge 207c may become larger in accordance with the level of the player character. More specifically, the maximum bullet time value of the player character when the video game starts may be set to 40 points, while the maximum bullet time value of the player character at an end game may be set to 200 points. Further, the control section 11 may increase the added amount and the maximum value of the bullet time gauge 207c with the accumulated period of time when the video game is executed. In this regard, the added amount and the maximum value of the bullet time value may be same as those of the ATB value, or may be different from those of the ATB value.

Figure 7:
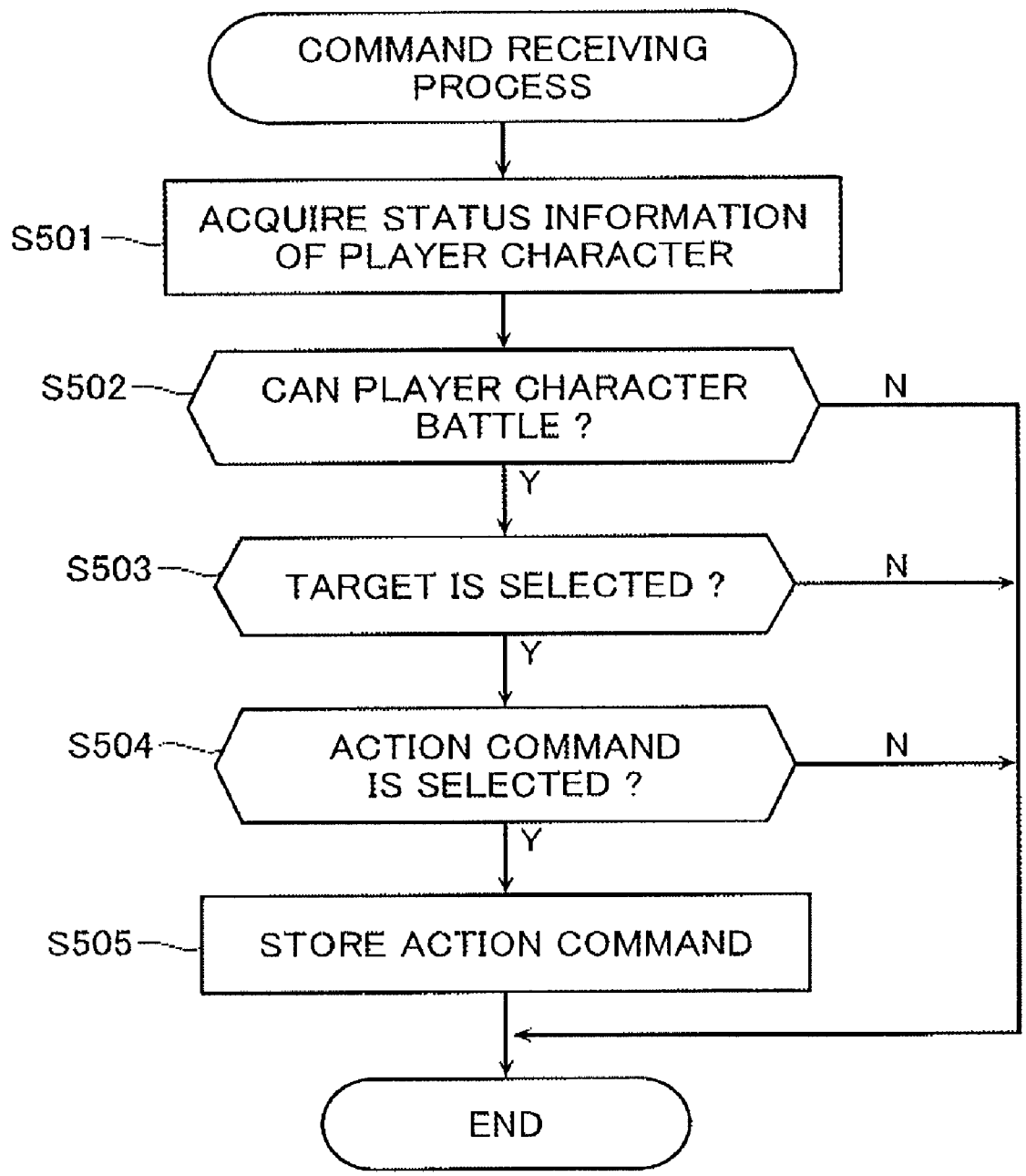
FIG. 7 is a flowchart that illustrates a command receiving process.

Next, the command receiving process described above (Step S202) will be described in detail with reference to FIG. 7. FIG. 7 is a flowchart that illustrates the command receiving process.

In the command receiving process, the control section 11 first acquires status information of the player character (Step S501). Subsequently, the control section 11 determines, on the basis of the acquired status information of the player character, whether the player character is in a battle possible state or not (Step S502). In the case where it is determined that the player character is in the battle possible state ("yes" at Step S502), the control section 11 receives selection of a target that is a subject of an action of the player character in accordance with the operation of the keypad 30 by the player (Step S503). On the other hand, in the case where it is determined that the player character is not in a battle possible state ("No" at Step S502), the control section 11 causes the command receiving process to be terminated.

Here, a concrete example of a process to receive the target selection (Step S503) will be described with reference to FIG. 3. As shown in FIG. 3, the player presses the lower key 31b of the cross key 31 to move the selection cursor 205 downward. A target is thereby selected. The player then determines the target by pressing the circle button 32a. In the example shown in FIG. 3, an enemy character A is selected as a target.

When the control section 11 receives the selection of the target ("Yes" at Step S503), the control section 11 causes the display device 50 to display a list of selectable commands, and receives selection of a command in accordance with the operation of the keypad 30 by the player (Step S504).

Figure 8:
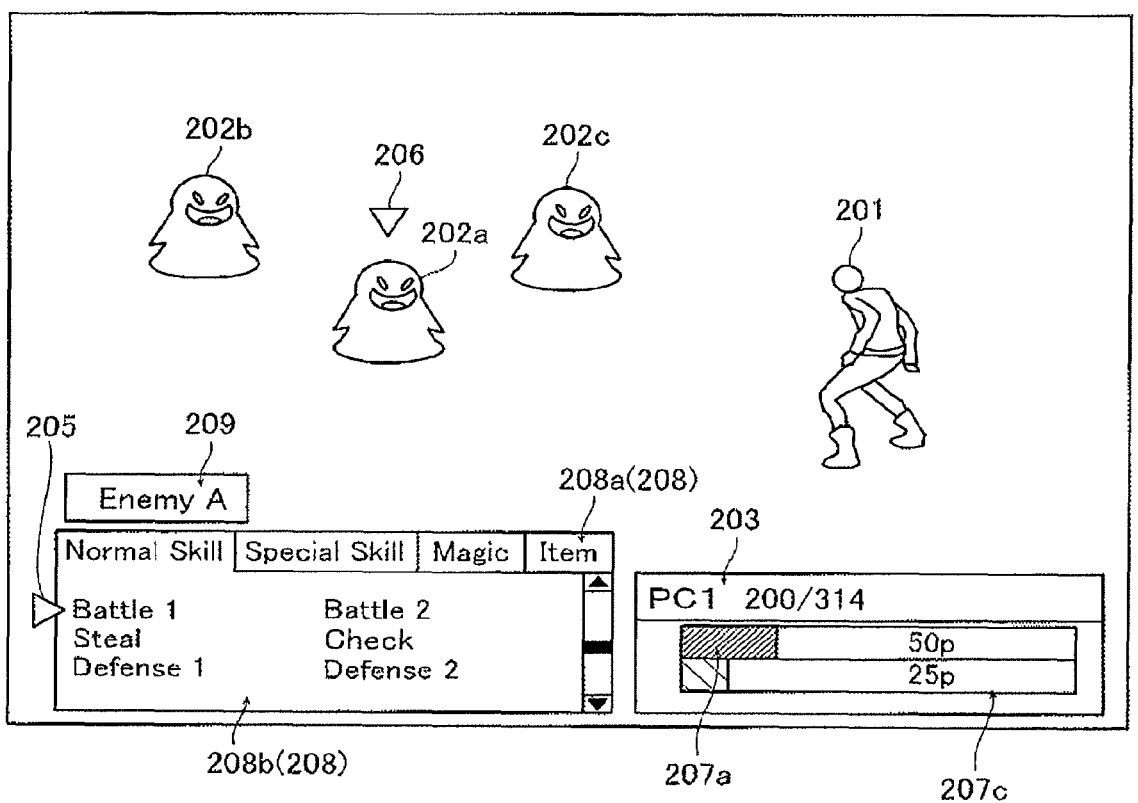
FIG. 8 is an explanatory drawing that shows a three-dimensional field screen in a state where a predetermined period of time elapses after a target is selected at a state shown in FIG. 3.

Next, a concrete example of the list of the selectable command to be displayed and reception of command selection (Step S504) will be described with reference to FIG. 8. FIG. 8 is an explanatory drawing that shows a three-dimensional field screen in a state where a predetermined period of time elapses after a target is selected at a state shown in FIG. 3. As shown in FIG. 8, a command display region 208 and a target name display region are displayed on the image display screen 51 of the display device 50. In this case, the list of the selectable commands is displayed in the command display region 208. A character name as the target is displayed in the target name display region 209.

The command display region 208 is constituted from a command category selecting region 208a for selecting a category of a command, and a command selecting region 208b for selecting a command name and command value. A "normal skill", a "special skill", "magic" and an "item" are displayed in the command category selecting region 208a, for example. In the case where the category is the "normal skill", command names such as "battle 1", "battle 2", "steal", "check", "defense 1" and "defense 2" are displayed in the command selecting region 208b.

The "enemy A" is displayed as the character name of the target in the target name display region 209. Further, since a predetermined period of time elapses from the state shown in FIG. 3, the ATB value in the ATB gauge 207a is added to 50 points, and the bullet time value in the bullet meter 207c is added to 25 points, for example. In the case where a lot of commands can be selected, a scroll bar may be provided in the command selecting region 208b, for example. In this case, a command name may be displayed by moving the scroll bar.

The player can determine a command by pressing the lower key 31b of the cross key 31 to move the selection cursor 205, and pressing the circle button 32a to select a command. In the example shown in FIG. 8, the "battle 1" is selected as a command.

Subsequently, in the case where it is determined that the command is selected on the basis of an instruction signal using the keypad 30 from the player ("Yes" at Step S504), the control section 11 stores the selected command in a predetermined data area of the HDD 13, for example (Step S505). The processing flow is then terminated.

Figure 9:
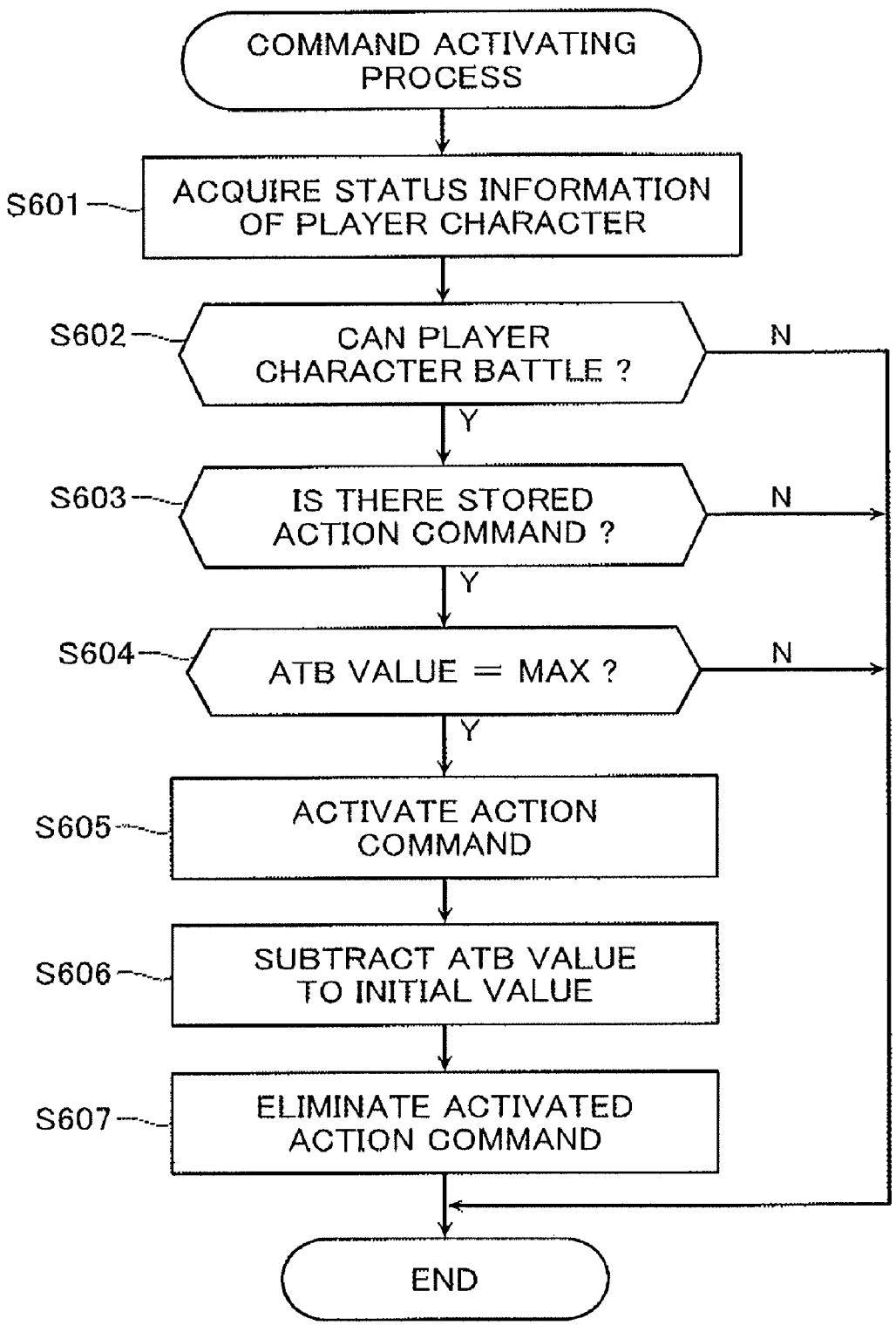
FIG. 9 is a flowchart that illustrates details of a command activating process.

Next, the command activating process described above (Step S203) will be described in detail with reference to FIG. 9. FIG. 9 is a flowchart that illustrates an example of the command activating process.

In the command activating process, the control section 11 first acquires status information of the player character (Step S601). Subsequently, the control section 11 determines, on the basis of the acquired status information of the player character, whether the player character is in a battle possible state or not (Step S602). In the case where it is determined that the player character is in the battle possible state ("Yes" at Step S602), the control section 11 determines whether there is a stored action command or not (Step S603). In the case where it is determined that there is a stored action command ("Yes" at Step S603), the control section 11 determines whether the accumulated ATB value becomes the maximum value or not (Step S604).

In the case where it is determined that the accumulated ATB value is the maximum value ("Yes" at Step S604), the control section 11 activates the stored action command (Step S605). On the other hand, in the case where it is determined that the player character is not in the battle possible state ("No" at Step S602), in the case where it is determined that there is no stored (that is, received) action command ("No" at Step S603), or in the case where it is determined that the accumulated ATB value is not the maximum value ("No" at Step S604), then the command activating process is terminated.

When the action command is activated, the control section 11 subtracts the ATB value to an initial value (for example, 0 point) to display the subtracted ATB value (Step S606). The control section 11 eliminates the stored action command thus activated (Step S607). The command activating process is then terminated.

Figure 10:
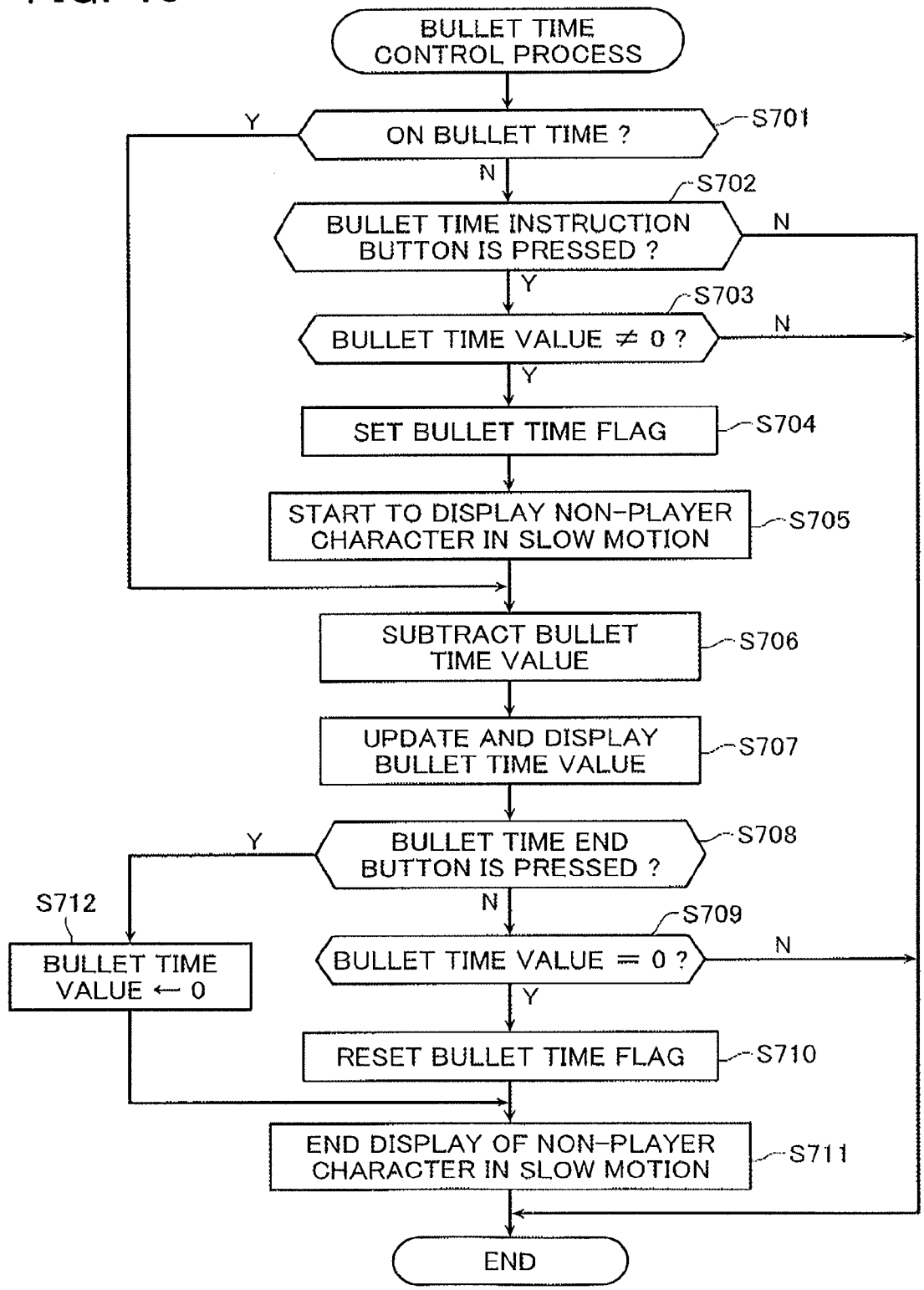
FIG. 10 is a flowchart that illustrates details of a bullet time control process.

Next, the bullet time control process described above (Step S204) will be described in detail with reference to FIG. 10. FIG. 10 is a flowchart that illustrates details of the bullet time control process.

In the bullet time control process, the control section 11 first confirms whether bullet time control is being executed or not (Step S701). This confirmation is executed by confirming whether or not a bullet time flag (will be described later) is set or not. In the case where it is confirmed that the bullet time control is not being executed ("No" at Step S701), the control section 11 confirms whether or not a predetermined bullet time instruction button (for example, the X button 32b) is pressed by means of operations of the player using the keypad 30 (Step S702). Namely, the control section 11 confirms whether or not an instruction to execute bullet time control is inputted from the player.

Figure 11:
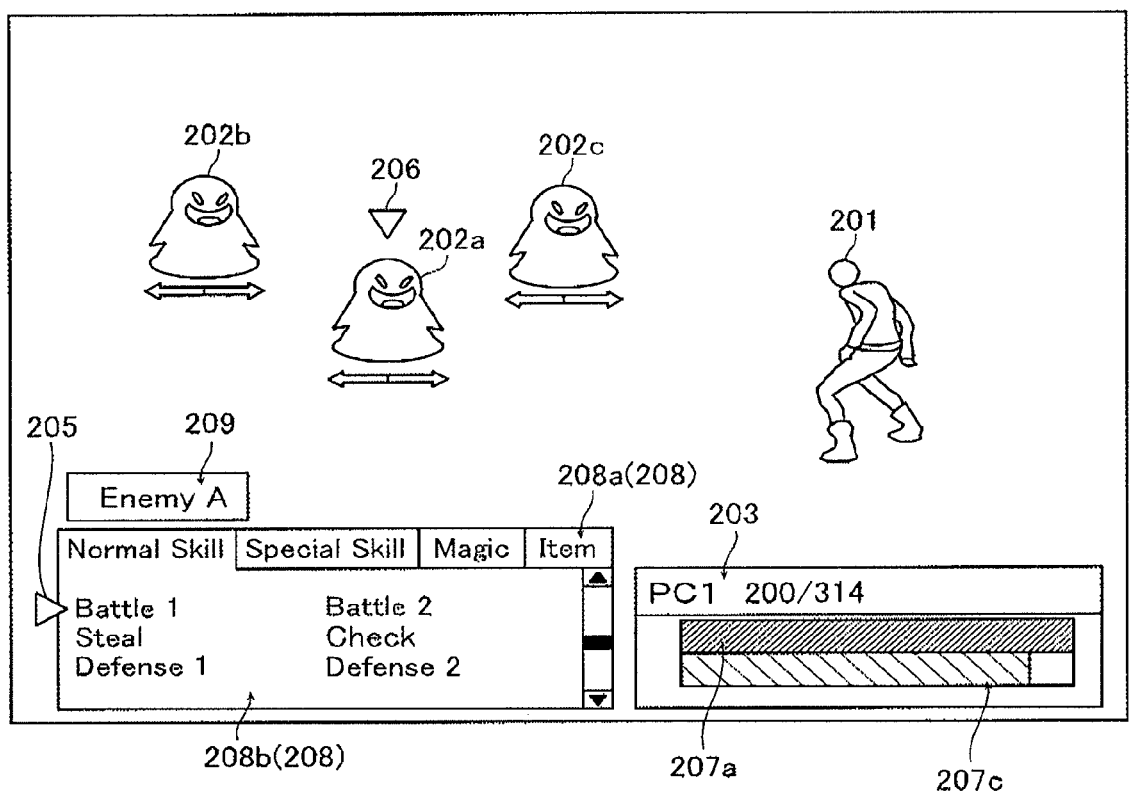
FIG. 11 is an explanatory drawing that shows a three-dimensional field screen when a bullet meter becomes a full state.

In the case where it is confirmed that the predetermined bullet time instruction button is pressed, the control section 11 confirms whether or not the accumulated value of the bullet time value is a predetermined initial value (that is, the minimum value: "0" in the present embodiment) (Step S703). Namely, the control section 11 confirms whether or not the accumulated value is more than the predetermined initial value (or whether or not the bullet time value is filled even by a little). For example, in the case where it is confirmed that the accumulated value of the bullet time value is not the predetermined initial value as shown in FIG. 11 (or that the bullet time value is filled even by a little), the control section 11 sets a bullet time flag (Step S704), and starts to cause the display device 50 to display a non-player character in slow motion (that is, to display the non-player character under bullet time control) (Step S705). Namely, the control section 11 starts to execute the bullet time control.

Here, the bullet time flag is a flag that is to be set when to start the execution of the bullet time control, and to be reset when the execution of the bullet time control is terminated. The bullet time flag is utilized to determine whether or not the bullet time control is being executed and the like.

In the case where it is confirmed that the bullet time control is being executed ("Yes" at Step S701), or in the case where the execution of the bullet time control is started (Step S705), the control section 11 subtracts a predetermined bullet time value from the accumulated bullet time value (Step S706), and updates a display state of the bullet time gauge 207c to be displayed on the image display screen 51 of the display device 50 (Step S707). In this case, the control section 11 determines the predetermined bullet time value (subtracted amount) on the basis of the status information of the player character. For example, in the case where the player character is in the "slow condition", the predetermined bullet time value is set to a value lower than that in the "normal condition". Namely, in the case where the bullet time control is further executed in the "slow" condition, it is possible to lengthen control time of the bullet time control.

A subtracted amount of the bullet time value (that is, the predetermined bullet time value) may specifically be set to 0.3 seconds per one point. Further, the subtracted amount of the bullet time gauge 207c may become larger or smaller in accordance with the level of the player character.

Subsequently, the control section 11 confirms whether or not a predetermined bullet time end button (for example, the square button 32d) is pressed by means of operations of the player using the keypad 30 (Step S708). Namely, the control section 11 confirms whether or not forcible termination instruction of the bullet time control is made from the player.

In the case where it is confirmed that the bullet time end button is not pressed, the control section 11 causes the processing flow to shift to Step S709. On the other hand, in the case where it is confirmed that the bullet time end button is pressed, the control section 11 sets the bullet time value to an initial value (Step S712), and then causes the processing flow to shift to Step S710. In this way, in the case where the bullet time control is forcibly terminated, the bullet time value is returned to the initial value. In this regard, the processing flow may shift to Step S710 without setting the bullet time value to the initial value (that is, without executing the process at Step S712). By constructing the video game apparatus 100 in this manner, an adding process is restarted from the bullet time value remaining at the forcible termination. Thus, it is possible to effectively utilize the bullet time value remaining at the forcible termination without wasting it.

In the case where it is confirmed that the bullet time end button is not pressed, the control section 11 confirms whether or not the bullet time value becomes an initial value (for example, "0" point) (Step S709). In the case where it is confirmed that the bullet time value does not become the initial value ("No" at Step S709), the bullet time control process is terminated while maintaining the state that the bullet time control is executed.

Figure 12:
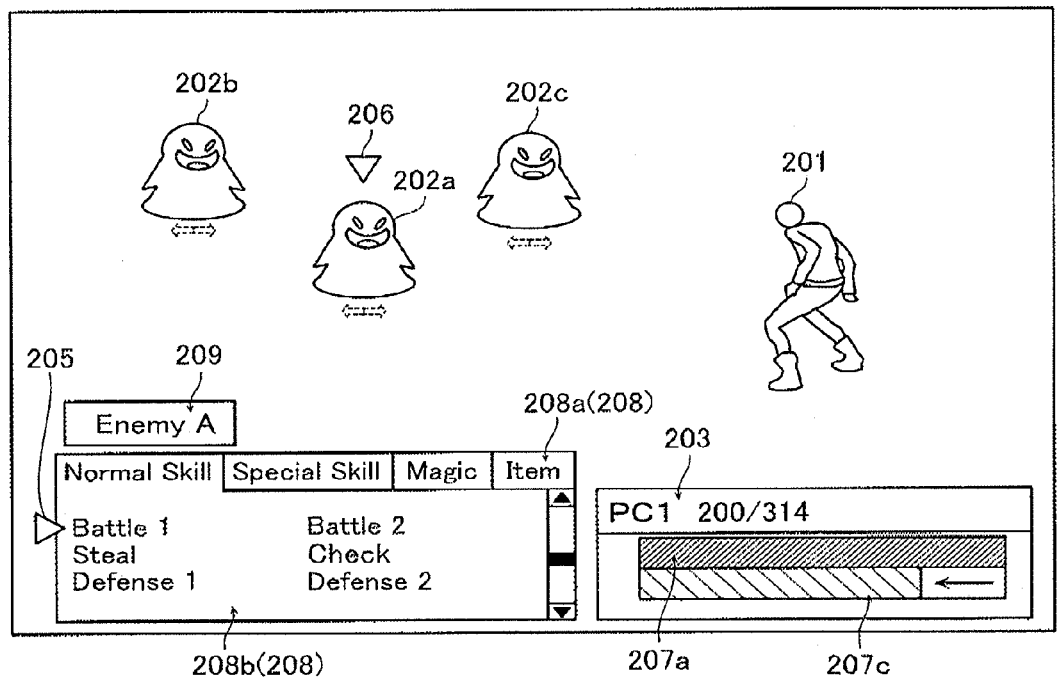
FIG. 12 is an explanatory drawing that shows a three-dimensional field screen after the bullet time control process is started.
Figure 13:
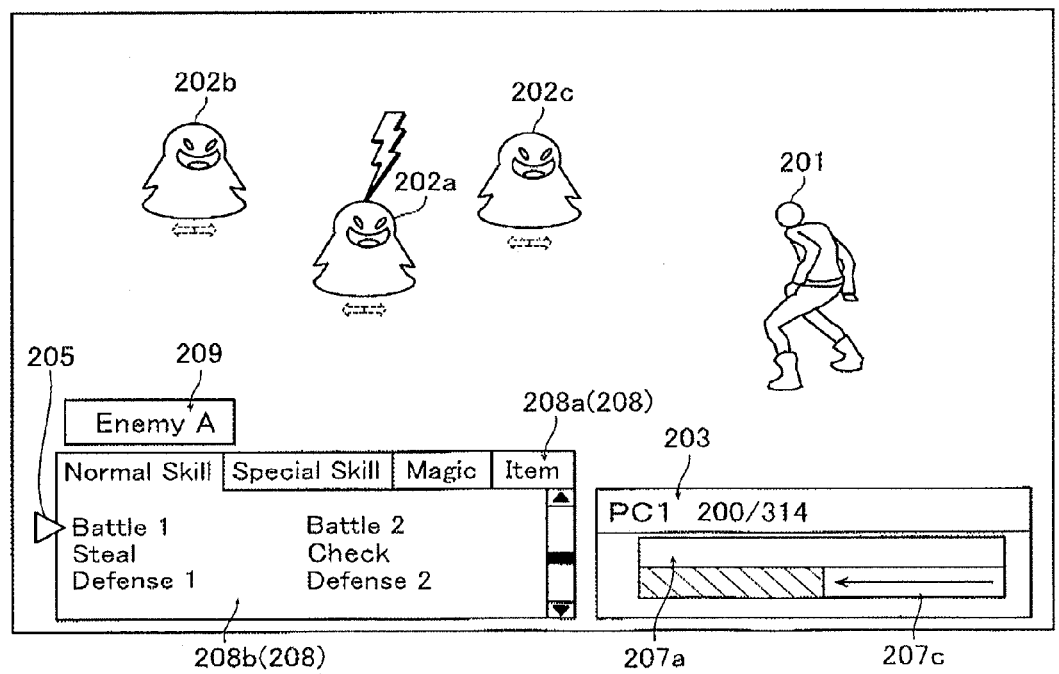
FIG. 13 is an explanatory drawing that shows a three-dimensional field screen when an attack is executed in the bullet time control process.

During the execution of the bullet time, for example, as shown in FIG. 12, the point (that is, the bullet time value) in the bullet meter 207c is subtracted with lapse of time. Further, although a non-player character is controlled to move in high speed in the normal condition as shown in FIG. 11, the non-player character becomes controlled to move in low speed as shown in FIG. 12. Thus, in the case where the bullet time control in which the non-player character is displayed in low speed is being executed, for example, the time when the player selects an action command such as an attack and recovery, or the time when the player character executes an action to avoid an attack from a non-player character can be ensured sufficiently. In the case where the player character executes an attack as the an action command, for example, the player may select the action command when the ATB gauge 207a is full as shown in FIG. 12, and then execute the attack against a non-player character (that is, an enemy character) as shown in FIG. 13.

On the other hand, in the case where it is confirmed that the bullet time value becomes the initial value ("Yes" at Step S709), the control section 11 resets the bullet time flag (Step S710), whereby the display of the non-player character in slow motion (that is, display by the bullet time control) is terminated (Step S711). Namely, the bullet time control process is terminated.

Next, a method of selecting an action pattern of a non-player character in the present embodiment will now be described. In the present embodiment, an action of the non-player character is controlled using a table for setting an action pattern of a non-player character (an action pattern setting table) in which actions of each of non-player characters are defined in advance. For example, as shown in FIG. 14, various action patterns including special patterns that becomes available under the bullet time control (special control) (such as an action pattern at bullet time control, and an action pattern at special control) are set in the action pattern setting table.

Figures 14, 15:
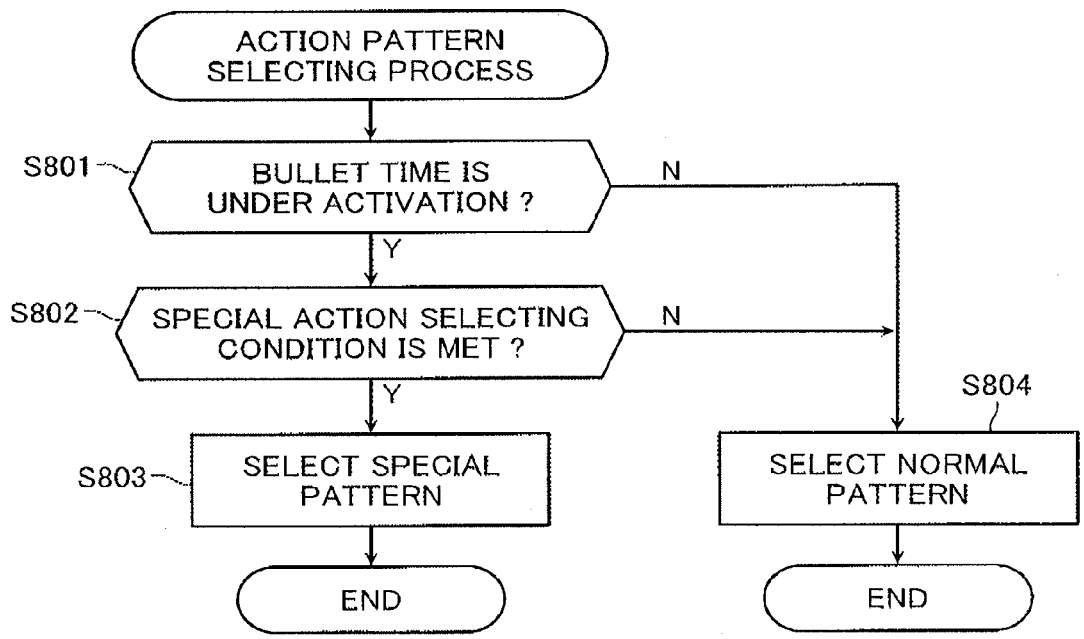
FIG. 14 is an explanatory drawing that shows a table for setting an action pattern.
FIG. 15 is a flowchart that illustrates an example of an action pattern selecting process.

More specifically, as shown in FIG. 14, various action patterns such as a static pattern indicating an action pattern (display action pattern) in a static condition, an attack pattern indicating an action pattern during an attack, and a special pattern indicating an action pattern in a special condition are set in advance for respective non-player characters in the action pattern setting table. In this regard, although it is not shown in FIG. 14, action patterns for other actions such as a defense pattern and a movement pattern are also set in the action pattern setting table. Further multiple kinds of action patterns may be set for each of actions.

The special pattern is an action pattern that becomes available when the player carries out a specific operation at the bullet time control. Namely, the special pattern is selected at predetermined timing to execute an action corresponding to the special pattern. The predetermined timing is timing when it is determined that the player carries out an action which satisfies a condition for activating a special pattern (for example, a pattern that the player character executes a specific attack against a non-player character at specific timing) in a state that the non-player character is displayed in slow motion with respect to the player character. More specifically, for example, it is considered a detailed action that a dragon that is an enemy character among non-player characters opens his mouth and breathes a fireball or fire. In this regard, in an attack pattern at normal speed, such an action that a dragon opens his mouth and breathes a fireball or fire is executed in a moment at high speed. For this reason, since the player cannot view the action, the player cannot respond to the action. On the other hand, since the action of the dragon is displayed in slow motion in the present embodiment, the player can view when the dragon breathes a fireball or fire, thereby securing response time. When the player character makes an attack against the mouth of the dragon in a state where a fireball is formed in the mouth of the dragon in accordance with operations of the player, an action image of a special pattern "a flash explosive gimmick is displayed so that the fireball is exploded in the mouth of the dragon" is executed in place of a gimmick when a normal attack is hit. In this regard, although the special pattern is not limited to timing when an attack is suffered, it may appear in any other timing.

FIG. 15 is a flowchart that illustrates an example of an action pattern selecting process. The action pattern selecting process is a process to select an action pattern of each of non-player characters to be displayed on the image display screen 51. The action pattern selecting process is executed when an action in response to a previously selected action pattern is terminated.

In the action pattern selecting process, the control section 11 first confirms, on the basis of, for example, a setting state of the bullet time flag, whether bullet time control is being executed or not (Step S801). In the case where it is confirmed that bullet time control is being executed, the control section 11 determines whether or not a special action selecting condition is met (Step S802). In this case, the special action selecting condition is a condition for determining whether or not a non-player character is caused to execute an action on the basis of a special pattern. It is determined whether the special action selecting condition is met or not using a lot result and/or the kind of non-player character to be displayed at the determination at Step S802. In the case where the lot result is used, the video game apparatus 100 may be constructed so that random number lot is executed, for example, when the non-player character suffers a specific attack from the player character under the bullet time control, or during activation of the bullet time control.

In the case where it is determined that the special action selecting condition is met ("Yes" at Step S802), the control section 11 selects a special pattern as an action pattern of the corresponding non-player character (Step S803). In the case where there are a plurality of special patterns, one special pattern may be selected using random number lot or the like, for example. On the other hand, in the case where it is determined that the special action selecting condition is not met ("No" at Step S802), or in the case where it is confirmed that bullet time control is not being executed ("No" at Step S801), the control section 11 selects any one of normal patterns (including an attack pattern, a static pattern, and the like, for example) other than the special pattern(s) (Step S804).

The control section 11 then causes the corresponding non-player character to execute various actions in accordance with the action pattern selected as described above.

In the present embodiment, when the execution of bullet time control is started, an action speed of a non-player character is lowered while an action speed of the player character is maintained. For example, although an action speed of the non-player character is fast to the extent that the player character cannot respond to the action of the non-player character at non-bullet time control, the action speed of the non-player character is caused to become slow to the extent that the player character can respond to the action of the non-player character at the bullet time control. For example, the player character cannot attack a non-player character (for example, an enemy character such as a bird or an airplane) to lower the HP of the non-player character up to zero at the non-bullet time control (that is, in the normal condition) because such a non-player character can appear on the image display screen 51 only in an extremely short time by flying in extremely high speed. However, by executing such control as described above, the player character can attack the non-player character to lower the HP of the non-player character up to zero at the bullet time control because the non-player character can appear on the image display screen 51 in a relatively long time by lowering flying speed of the non-player character. Further, for example, the player character cannot follow a non-player character (for example, an event attracting character such as a bird or an airplane) at the non-bullet time control (that is, in the normal condition) because the non-player character flies in extremely high speed. However, the player character can follow such a non-player character at the bullet time control because flying speed of the non-player character is lowered.

In this regard, the "event attracting character" means a character to attract the player character to a predetermined event (or to induce a predetermined event for the player character) without an action of the player character thwarted (for example, a character that guides the player character to a place where treasure is hid, a character to apply a predetermined privilege to the player character by following it, and the like).

Namely, in the present embodiment, timing of an instruction to execute the bullet time control is not limited to timing of a battle scene of the player character. The instruction may be received on the basis of operations of the player even at timing of a movement scene of the player character and the like. Thus, a non-player character includes a neutral character that does not thwart an action of the player character aggressively (specifically, a character that counterattacks the player character only when the player character first makes an attack against the character) an event attracting character as described above, and the like, in addition to an enemy character that aggressively thwarts an action of the player character.

Further, in the present embodiment, in the case where the bullet time control is being executed when the control section 11 determines an action pattern of a non-player character, the control section 11 may select the action pattern at the bullet time control from the action pattern setting table with high probability or consistently. By constructing the video game apparatus 100 in this manner, the action by the action pattern at the bullet time control appears with high probability or consistently. Thus, it is possible to become an effective game state at the bullet time control.

As explained above, in the embodiment described above, the video game apparatus 100 is constructed as follows. Namely, the control section 11 adds a bullet time value (special control point) in accordance with predetermined time development up to a predetermined maximum accumulated value, and causes the display device 50 to display an accumulated value of the bullet time value on the image display screen 51. In the case where the accumulated value of the bullet time value is more than a predetermined initial value when the control section 11 receives an instruction to execute bullet time control (special control) on the basis of operations of the player, the control section 11 executes the bullet time control to slow an action speed of a non-player character with respect to that of the player character. Thus, it is possible to execute control processes rich in variety of a battle scene and the like, and an unrealistic world like one scene of a film, which cannot be realized in the real world, can be expressed. This makes it possible to improve interest in a video game for a player.

Namely, there is no need for the player to wait until the bullet meter 207c is filled up. In the case where the bullet meter 207c is filled even by a little, the player can execute the bullet time control at the timing that the player intends. The player is newly required to determine what timing is the bullet time control started. Thus, it is possible to increase variations of the control processes in the video game, and this makes it possible to execute the control processes rich in variety of a battle scene and the like.

More specifically, in the case where, for example, an enemy character that moves in high speed and/or an enemy character attacks the player character continuously appear on the image display screen 51, the player may operate an instruction to start the execution of the bullet time control. Thus, the player can cause the player character to make an attack against the enemy character that moves in high speed, or to defense the continuous attacks from the enemy character. Therefore, it is possible to provide new variations to the method of playing the video game in a battle scene.

In this regard, the video game apparatus 100 may be constructed so that the bullet time control can be activated only when the bullet time meter 207c is filled up.

Further, in the embodiment described above, the video game apparatus 100 is constructed so that the bullet time value is subtracted up to the predetermined initial value with a predetermined period of time in the case of starting the execution of the bullet time control, and the bullet time control is terminated when the bullet time value becomes the predetermined initial value. Thus, it is possible to continue the execution state of the bullet time control until the bullet time value becomes the predetermined initial value. In addition, in the case where the bullet meter 207c is displayed on the image display screen 51, the player can recognize the remaining time to terminate the bullet time control.

Moreover, in the embodiment described above, the video game apparatus 100 is constructed so that the control section 11 determines whether the bullet time value is to be added or not and the added amount of the bullet time in the case of the addition on the basis of the status of the player character and the accumulated execution time of the video game. Thus, it is possible to set a parameter to determine the adding speed of the bullet time value. Therefore, since the player is required to consider a procedure for conquering the video game, it is possible to improve interest in the video game for the player.

Furthermore, in the embodiment described above, an enemy character may make an instruction to execute bullet time control by means of the setting of the control programs. Namely, the enemy character may have an instruction of the bullet time control as one of special abilities of the enemy character. In this case, when a predetermined specific control activating condition is met (or when the condition set in the control program is met), the control section 11 may execute a specific control to speed up an action of the enemy character (non-player character) with respect to that of the player character. More specifically, the predetermined specific control activating condition is met in the case where the bullet time control that is special ability of the enemy character is specified (or instructed) in the action control of the enemy character.

In this regard, the video game apparatus 100 may be constructed so that the player can visually confirm whether or not the bullet time control is being executed in response to an instruction of the bullet time control by the enemy character in the case where the specific control described above can be executed. For example, the background of the image display screen 51 may be changed for the visual confirmation. Alternatively, the video game apparatus 100 may be constructed so that the player cannot visually confirm whether or not the bullet time control is being executed. In particular, by constructing the video game apparatus 100 in such a manner as the latter, the player is required to look at the image display screen 51 carefully even when the player character defenses an attack from any non-player character or waits in a battle scene. Thus, the player is required to make sure of whether or not the bullet time control is being executed in response to an instruction of the bullet time control by the enemy character. More specifically, in the case where the player character suffers damage only when an enemy character moves in a moment, the player can understand that the bullet time control is being executed by means of an instruction from the enemy character. For this reason, a new fun (or interest) of seeing through execution of the bullet time control by an instruction of a non-player character can be added to the video game. Thus, since the player can keep (or increase) realism (realistic sensation) and/or tension, this makes it possible to improve interest of the video game for the player.

Further, in the case where the bullet time control is being executed in response to an instruction of the bullet time control by the enemy character, the player can make an instruction to execute the bullet time control in order to fight back against the enemy character. Thus, the player can select to activate the bullet time control as the fight back against the enemy character. This makes it possible to increase variations of the video game, and it is possible to improve interest in the video game further.

Moreover, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention.

Furthermore, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

Further, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Moreover, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image display apparatus to display a player character on an image display screen of the image display apparatus, the video game processing apparatus controlling progress of the video game by controlling an action of the player character to be displayed on the image display screen in accordance with operations by a player, the video game processing apparatus comprising:

a special control point adder that adds a predetermined special control point add value to an accumulated special control point total in accordance with a lapse of a predetermined time up to a predetermined maximum accumulated value;

an accumulated special control point display controller that causes the image display apparatus to display the accumulated special control point total on the image display screen;

a special control executing instruction receiver that receives an instruction to execute a special control based on the operations of the player;

a special control executor that executes the special control, the special control displaying a non-player character in slow motion by decreasing an action speed of the non-player character; and a non-player character action controller that controls an action of the non-player character based on an action pattern selected from an action pattern setting table, the action pattern including at least one of a predetermined movement action pattern of the non-player character and a predetermined attack action pattern of the non-player character, wherein the special control executor determines whether or not the accumulated special control point total exceeds a predetermined threshold value in response to the special control executing instruction receiver receiving the instruction to execute the special control, and executes the special control in response to a determination that the accumulated special control point total exceeds the predetermined threshold value, wherein the action pattern setting table includes a special action pattern that becomes available in response to the special control being executed, and wherein the non-player character action controller determines, in response to the special control being executed, whether or not a predetermined special action selection condition is enabled, and when the special action selection condition is enabled, selects the special action pattern, thereby controlling the action of the non-player character based on the selected special action pattern.

2. The video game processing apparatus according to claim 1, further comprising:

a special control point subtract that subtracts a predetermined special control point subtract value from the accumulated special control point total when the accumulated special control point total exceeds a predetermined initial value, the special control point subtracter subtracting the predetermined special control subtract value from the accumulated special control point total each lapse of the predetermined time when the special control executor executes the special control, wherein the special control executor terminates executing the special control when the accumulated special control point total equals the initial value as a result of subtracting the predetermined special control point subtract value from the accumulated special control point total by the special control point subtracter.

3. The video game processing apparatus according to claim 1, wherein the special control executing instruction receiver receives the instruction to execute the special control based on the operations of the player during at least a battle scene and a movement scene of the player character, and wherein the non-player character that is displayed in slow motion as a result of the special control is one of an enemy character that aggressively thwarts an action of the player character, a neutral character that does not thwart an action of the player character aggressively, and an event attracting character that attracts the player character to a predetermined event without thwarting an action of the player character.

4. The video game processing apparatus according to claim 1, further comprising:

a specific control executor that executes a specific control when a predetermined specific control activating condition is enabled, the specific control increasing an action speed of the non-player character.

5. A tangible computer-readable medium for processing a video game, progress of the video game being controlled by causing an image display apparatus to display a player character on an image display screen of the image display apparatus, and controlling an action of each character to be displayed on the image display screen in accordance with operations by a player, the tangible computer-readable medium comprising:

an adder code segment that adds a predetermined special control point add value to an accumulated special control point total in accordance with a lapse of a predetermined time up to a predetermined maximum accumulated value;

a display code segment that displays, on the image display apparatus, the accumulated special control point total;

an instruction receiving code segment that receives an instruction to execute a special control based on an operation of the player;

a special control executing code segment that executes the special control, the special control displaying a non-player character in slow motion by decreasing an action speed of the non-player character;

a non-player control code segment that controls an action of the non-player character based on an action pattern selected from an action pattern setting table, the action pattern including at least one of a predetermined movement action pattern of the non-player character and a predetermined attack action pattern of the non-player character; and wherein the special control executing code segment determines whether or not the accumulated special control point total exceeds a predetermined threshold value in response to the instruction receiving code segment receiving the instruction to execute the special control, and executes the special control in response to a determination that the accumulated special control point total exceeds the predetermined threshold value, wherein the action pattern setting table includes a special action pattern that becomes available in response to executing the special control, and wherein the non-player control code segment determines, in response to the special control being executed, whether or not a predetermined special action selection condition is enabled, and when the special action selection condition is enabled, selects the special action pattern, thereby controlling the action of the non-player character based on the selected special action pattern.

6. The video game processing apparatus according to claim 1, wherein the non-player character action controller determines whether or not the special action selection condition is enabled by one of determining whether or not the non-player character receives a specific attack from the player character and a random number determiner.

7. The video game processing apparatus according to claim 2, wherein the non-player character action controller determines whether or not the special action selection condition is enabled by one of determining whether or not the non-player character receives a specific attack from the player character and a random number determiner.

8. The video game processing apparatus according to claim 2, wherein the special control executing instruction receiver receives the instruction to execute the special control based on the operations of the player during at least a battle scene and a movement scene of the player character, and wherein the non-player character that is displayed in slow motion as a result of the special control is one of an enemy character that aggressively thwarts an action of the player character, a neutral character that does not thwart an action of the player character aggressively, and an event attracting character that attracts the player character to a predetermined event without thwarting an action of the player character.

9. The video game processing apparatus according to claim 6, wherein the special control executing instruction receiver receives the instruction to execute the special control based on the operations of the player during at least a battle scene and a movement scene of the player character, and wherein the non-player character that is displayed in slow motion as a result of the special control is one of an enemy character that aggressively thwarts an action of the player character, a neutral character that does not thwart an action of the player character aggressively, and an event attracting character that attracts the player character to a predetermined event without thwarting an action of the player character.

10. The video game processing apparatus according to claim 2, further comprising:
   a specific control executor that executes a specific control when a predetermined specific control activating condition is enabled, the specific control increasing an action speed of the non-player character.

11. The video game processing apparatus according to claim 3, further comprising:
   a specific control executor that executes a specific control when a predetermined specific control activating condition is enabled, the specific control increasing an action speed of the non-player character.

12. The video game processing apparatus according to claim 6, further comprising:
   a specific control executor that executes a specific control when a predetermined specific control activating condition is enabled, the specific control increasing an action speed of the non-player character.

* * * * *